(12) United States Patent
Burgan (10) Patent No.: US 10,684,183 B2
(45) Date of Patent: Jun. 16, 2020

(54) POWERED TOTAL PRESSURE MEASUREMENT RAKE WITH TELEMETRY

(71) Applicant: The Boeing Campany, Chicago, IL (US)

(72) Inventor: Christopher R. Burgan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 15/961,730

(22) Filed: Apr. 24, 2018

(65) Prior Publication Data

US 2019/0323909 A1     Oct. 24, 2019

(51) Int. Cl.

| G01M 15/14 | (2006.01) |
|---|---|
| G01L 5/13 | (2006.01) |
| F01D 17/08 | (2006.01) |
| G01M 15/02 | (2006.01) |
| F01D 25/28 | (2006.01) |

(52) U.S. Cl.
CPC .............. *G01L 5/133* (2013.01); *F01D 17/08* (2013.01); *F01D 25/28* (2013.01); *G01M 15/02* (2013.01); *G01M 15/14* (2013.01); *F05D 2260/80* (2013.01); *F05D 2260/83* (2013.01)

(58) Field of Classification Search
CPC ....................................................... G01M 15/14
USPC ...................................................... 73/112.01
See application file for complete search history.

(56) References Cited

U.S. PATENT DOCUMENTS

| 3,835,701 | A | * | 9/1974 | Murphy | ................... | G01L 5/133 |
|---|---|---|---|---|---|---|
| | | | | | | 73/112.04 |
| 3,837,220 | A | * | 9/1974 | McDonald | .............. | G01L 5/133 |
| | | | | | | 73/112.04 |
| 3,886,790 | A | * | 6/1975 | Plett | ......................... | G01L 5/133 |
| | | | | | | 73/112.04 |
| 4,144,768 | A | * | 3/1979 | Andersson | ................ | G01H 3/12 |
| | | | | | | 702/140 |
| 4,433,584 | A | * | 2/1984 | Kokoszka | ................ | G01P 5/175 |
| | | | | | | 73/861.66 |
| 4,788,855 | A | * | 12/1988 | Laskody | .................. | G01L 5/133 |
| | | | | | | 73/112.04 |
| 5,433,114 | A | * | 7/1995 | Cook | ...................... | G01K 13/02 |
| | | | | | | 374/E13.006 |
| 6,595,062 | B1 | * | 7/2003 | Luke | ...................... | F01D 17/085 |
| | | | | | | 73/170.02 |
| 2004/0218175 | A1 | * | 11/2004 | Barkhoudarian | ......... | F02K 9/96 |
| | | | | | | 356/326 |
| 2009/0031801 | A1 | * | 2/2009 | Martindale | ........... | F01D 21/003 |
| | | | | | | 73/431 |
| 2010/0158074 | A1 | * | 6/2010 | Fortier | .................... | G01K 1/026 |
| | | | | | | 374/208 |
| 2012/0216608 | A1 | * | 8/2012 | Schleif | .................... | F01D 17/08 |
| | | | | | | 73/112.01 |

(Continued)

*Primary Examiner* — Eric S. McCall
(74) *Attorney, Agent, or Firm* — Felix L. Fischer (57) ABSTRACT

A system for total pressure measurement of a propulsive stream through a turbine engine, the system incorporates a track circumferentially mounted on a fan exhaust nozzle proximate a trailing edge. A carriage is mounted in the track and adapted for translation through a range of azimuthal angles relative to an engine centerline. A pressure measurement rake extends from the carriage and has a probe mount protruding radially inward into a fan flow duct with a plurality of pressure probes mounted to a leading edge of the probe mount.

20 Claims, 11 Drawing Sheets

(56) References Cited

U.S. PATENT DOCUMENTS

| | | | |
|---|---|---|---|
| 2012/0324988 A1* | 12/2012 | Hockaday | G01L 15/00 73/112.01 |
| 2013/0247686 A1* | 9/2013 | Watkins | G01L 7/00 73/861.65 |
| 2014/0208764 A1* | 7/2014 | Ekanayake | F02C 9/16 60/773 |
| 2015/0000303 A1* | 1/2015 | Hockaday | F02C 7/32 60/784 |
| 2015/0314436 A1* | 11/2015 | Reid | B25J 11/007 414/800 |
| 2015/0314890 A1* | 11/2015 | DesJardien | B66C 5/02 212/324 |
| 2017/0138216 A1* | 5/2017 | Giordan | G01P 5/14 |
| 2018/0283960 A1* | 10/2018 | Giordan | G01K 13/02 |
| 2019/0264636 A1* | 8/2019 | Kumar | G10K 11/161 |

\* cited by examiner

POWERED TOTAL PRESSURE MEASUREMENT RAKE WITH TELEMETRY

BACKGROUND INFORMATION

Field

Implementations shown in the disclosure relate generally to pressure test apparatus for fan or core propulsive streams of a turbofan engine nozzle system and more particularly a total pressure measurement rake mounted for rotatable positioning in the flow stream.

Background

Surveying the total pressure field of a turbofan nozzle propulsive stream is necessary to adequately define the performance of the engine and nozzle. Current measurements of the pressure field use a sequence of fixed rakes and pressure lines which must be manually positioned in increments at many different locations to fully sample the entire pressure field. The engine must be shut down to allow rake re-positioning, then brought back to the same operating condition to measure the pressure at the new rake location. This lengthy process is repeated over many days or more to fully sample the pressure field and may be subject to variation in measurement data due to changes in the ambient environment or engine settings between measurements.

SUMMARY

Exemplary implementations provide a system for total pressure measurement of a propulsive stream through a turbine engine. The system incorporates a track circumferentially mounted on a fan exhaust nozzle trailing edge. A carriage is mounted in the track and adapted for translation through a range of azimuthal angles relative to an engine centerline. A pressure measurement rake extends from the carriage and has a probe mount protruding radially inward into a fan flow duct with a plurality of pressure probes mounted to a leading edge of the probe mount.

The exemplary implementations allow a method for total pressure measurement of a propulsive stream. A motor is activated through a motor controller as commanded by a control system to position a carriage of a pressure measurement rake at a desired location in a track. Pressure data is transmitted from radially spaced locations of a plurality of pressure probes mounted to the carriage through a telemetry unit to a data processor. The motor is then activated to reposition the carriage at a next selected location in the track.

BRIEF DESCRIPTION OF THE DRAWINGS

The features, functions, and advantages that have been discussed can be achieved independently in various implementations or may be combined in yet other implementations, further details of which can be seen with reference to the following description and drawings.

DETAILED DESCRIPTION

The exemplary implementations described herein for a total pressure measurement system provide a powered total pressure measurement rake with telemetry to survey the total pressure field of the fan or core propulsive streams of a turbofan engine nozzle system. The total pressure rake incorporates multiple pressure probes spanning the flow field of a fan or core propulsive stream in the radial direction from the boundary layer proximate the inner flow path of the duct or nozzle to the boundary layer proximate the outer flow path of the duct or nozzle. The total pressure rake extends from a carriage constrained in a track mounted to the duct or nozzle proximate a trailing edge. An electric motor with a friction drive wheel or other traction device moves the carriage in the track to selected azimuthal positions thereby allowing a survey of most or all of the propulsive stream of interest. A telemetry system is used to transmit measured pressure to a remote sensing and data recording system. Alternatively, a single wire or fiber optic cable with multi-channel transmission capability is used for direct transmission of the data.

Figure 1:
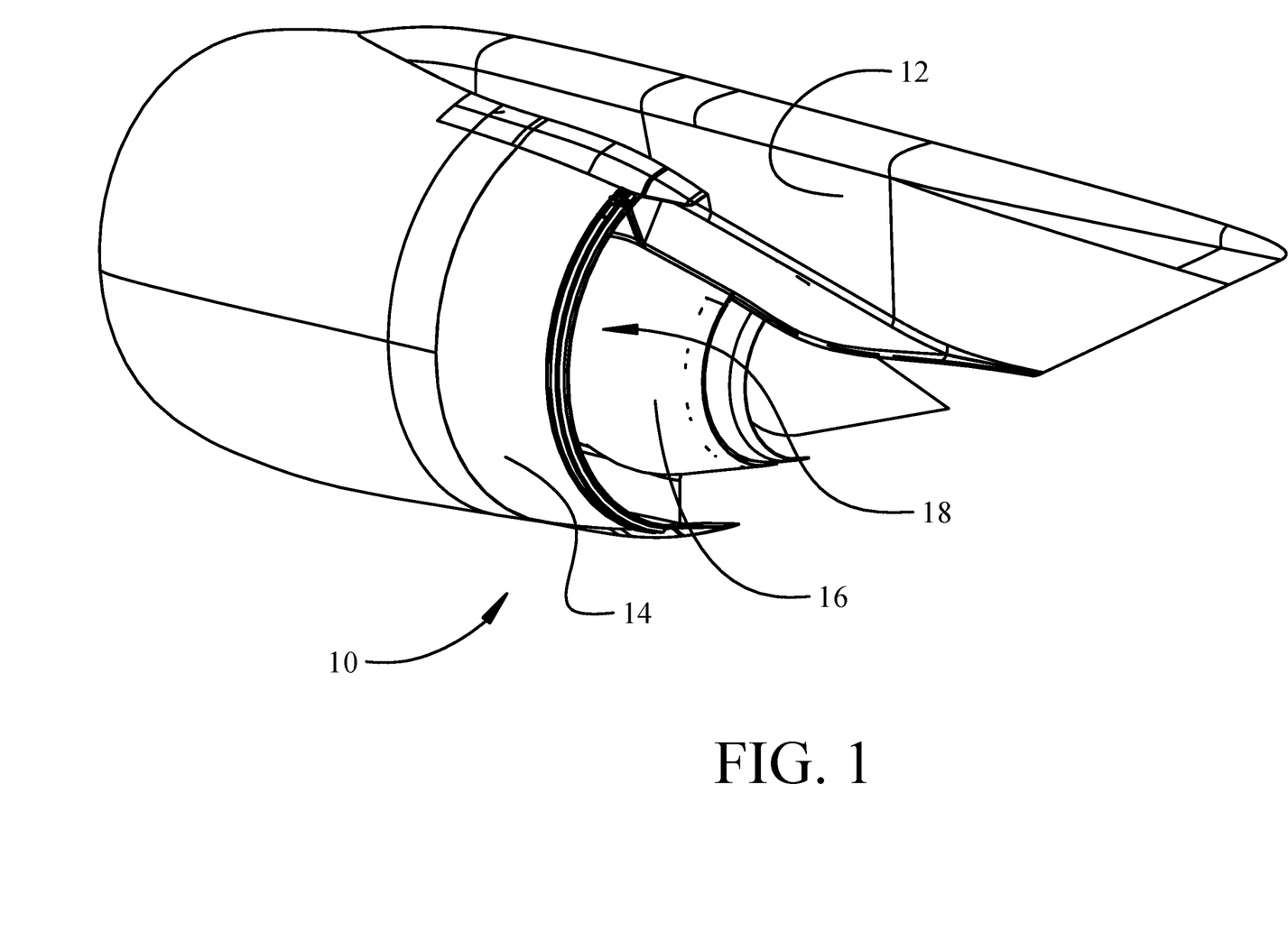
FIG. 1 is a pictorial representation of an aircraft engine nacelle assembly employing an exemplary implementation of a total pressure measurement system with a powered pressure measurement rake.
Figure 2:
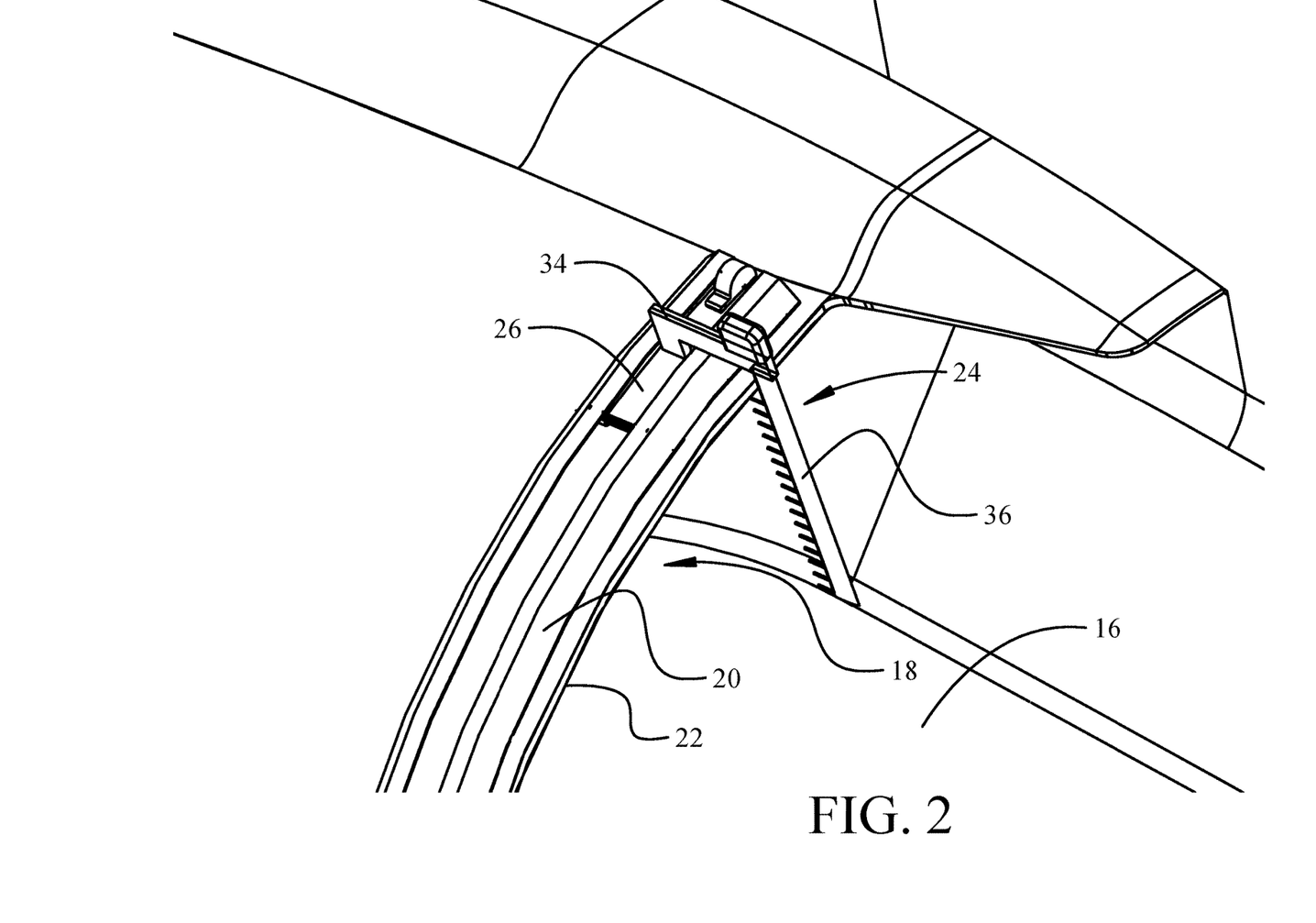
FIG. 2 is a detailed pictorial representation of the pressure measurement rake mounted in a track proximate a trailing edge of a fan exhaust nozzle of the nacelle assembly.
Figure 3:
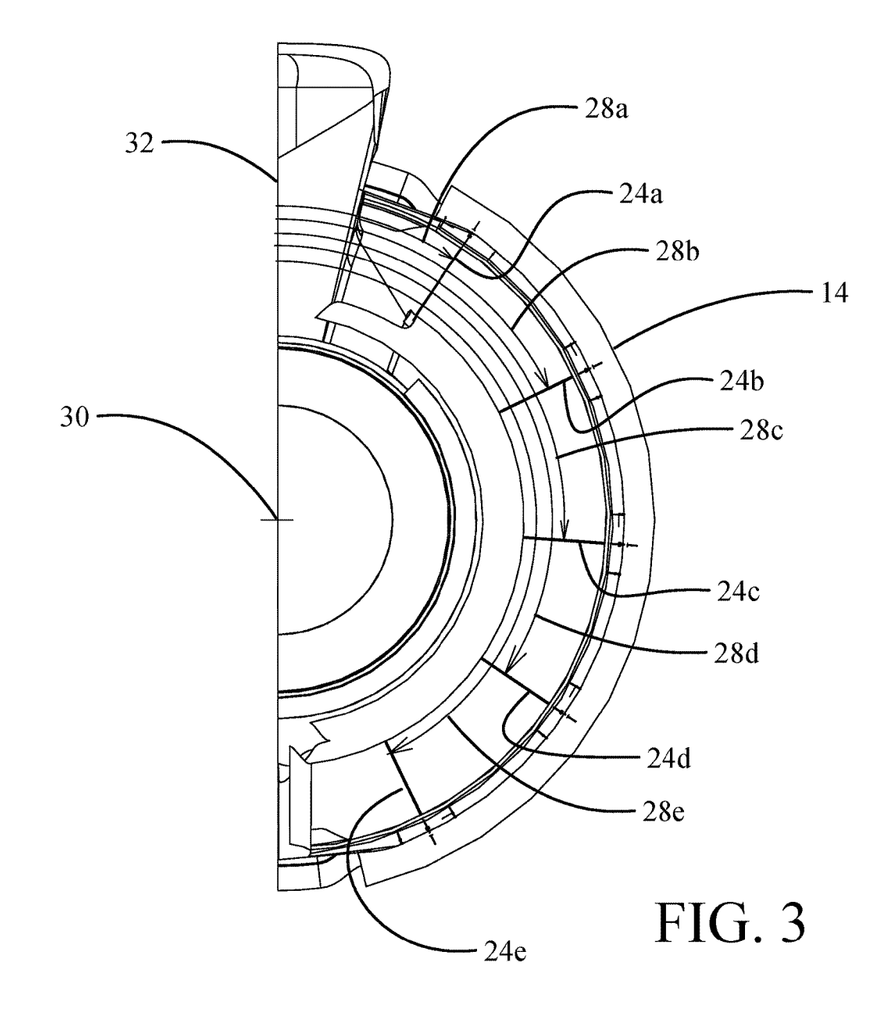
FIG. 3 is a front section view of the implementation of FIGS. 1 and 2 showing azimuthal positioning of the pressure measurement rake.
Figure 4:
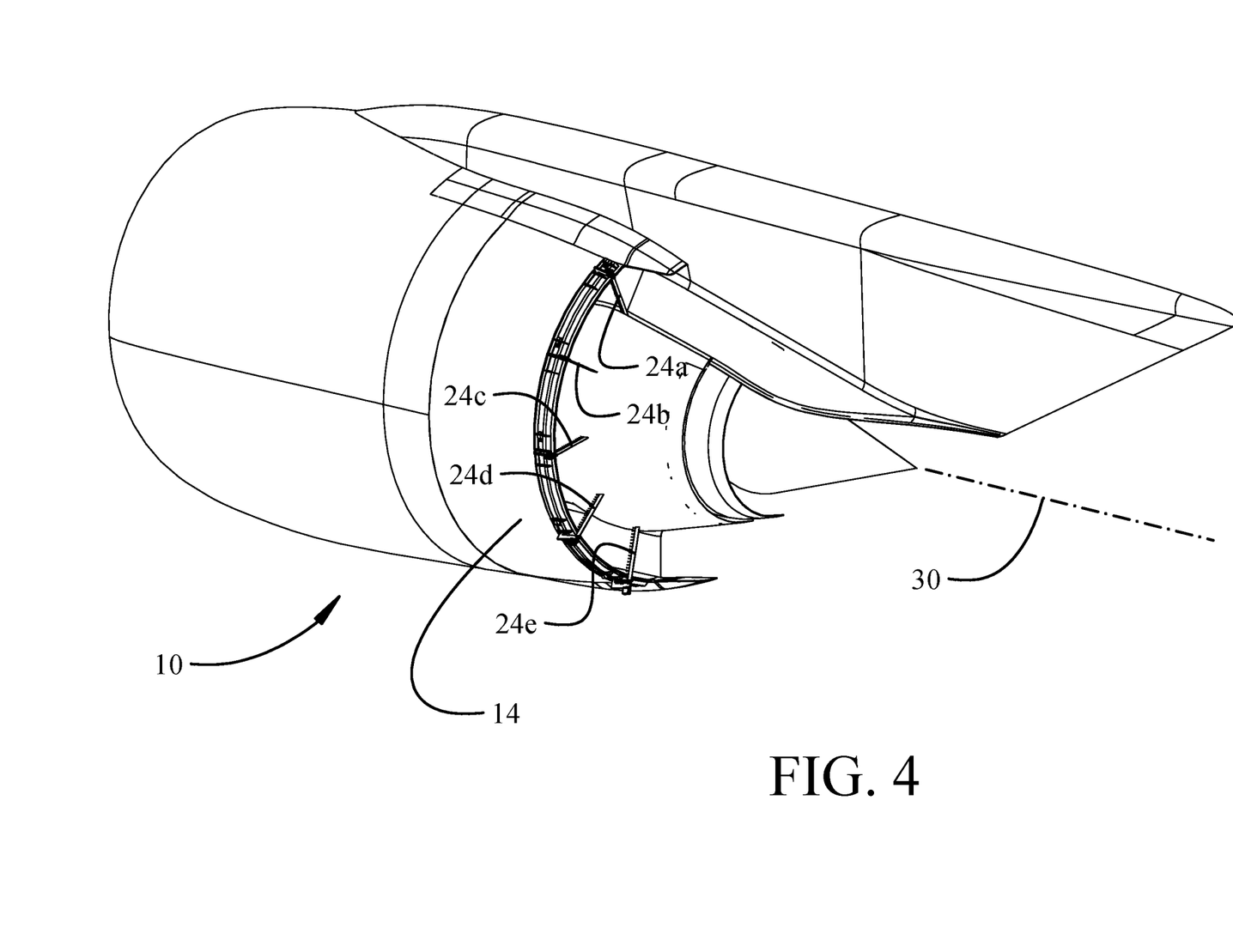
FIG. 4 is an aft pictorial representation showing the azimuthal positioning of FIG. 3.
Figure 5:
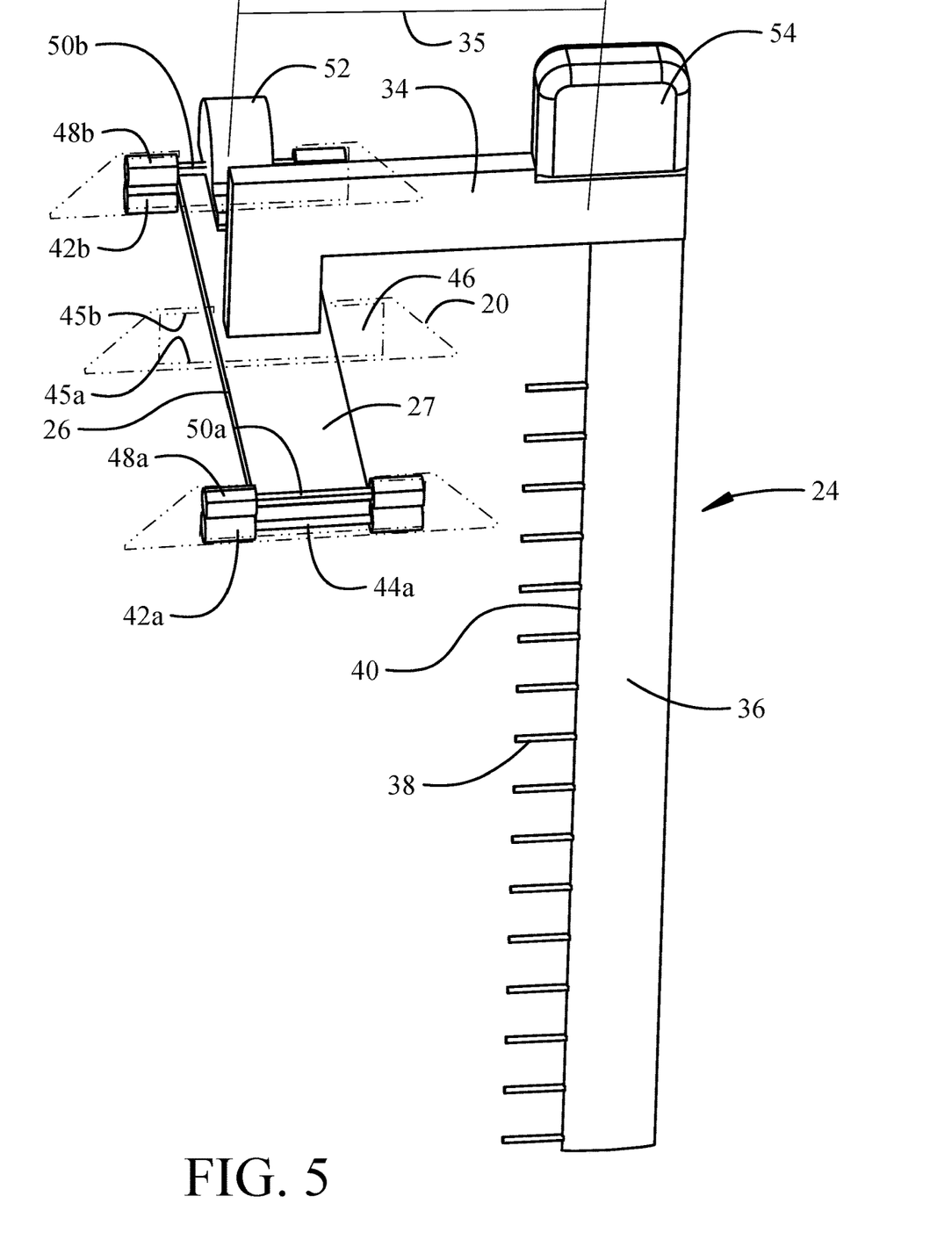
FIG. 5 is a detailed upper side pictorial representation of the pressure measurement rake.
Figure 6:
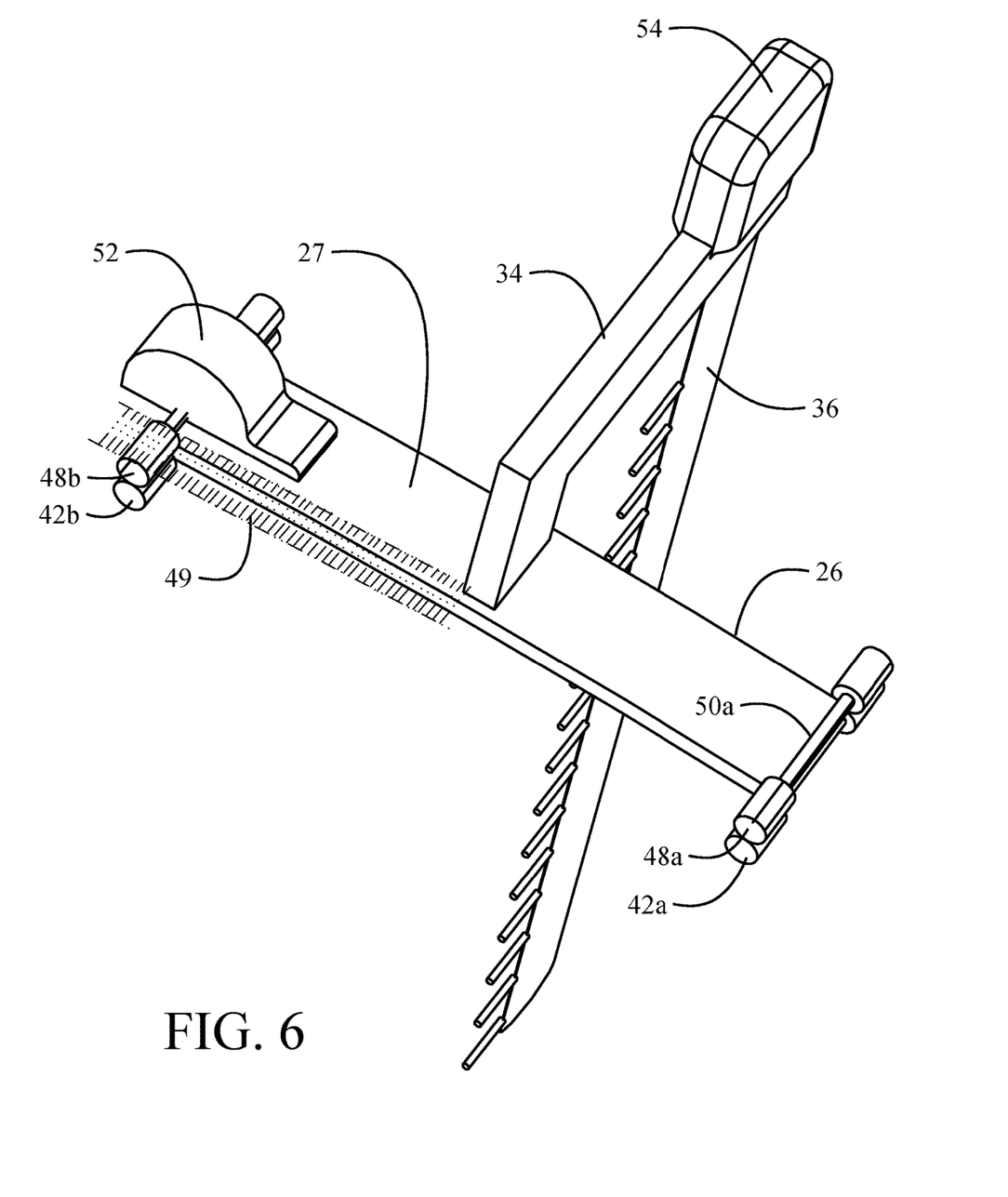
FIG. 6 is a second detailed pictorial representation of the pressure measurement rake.
Figures 7, 8:
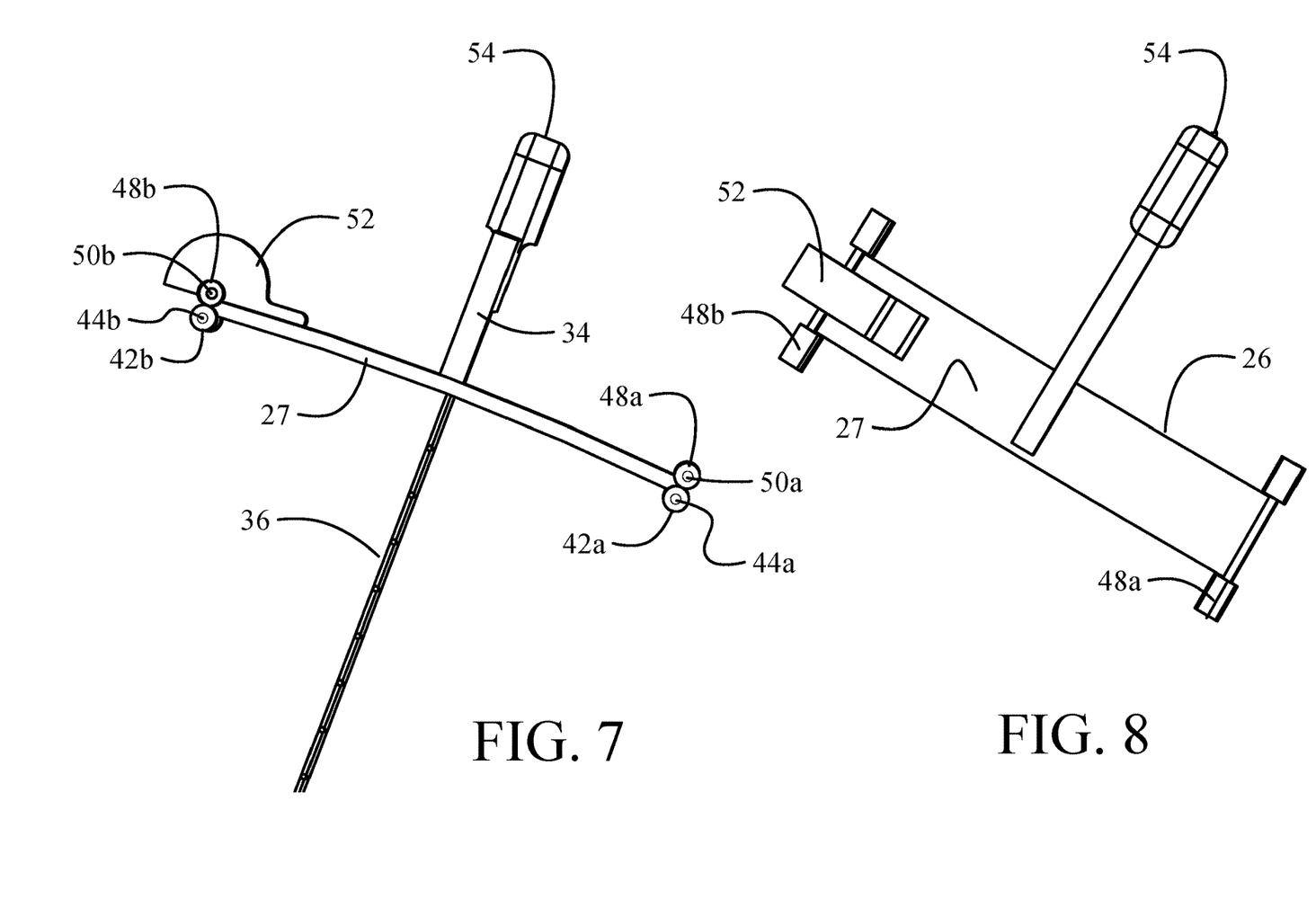
FIG. 7 is a detailed front view of the pressure measurement rake.
FIG. 8 is a detailed top view of the pressure measurement rake.

Referring to the drawings, FIG. 1 shows an aircraft engine nacelle assembly 10 suspended from a pylon 12. The nacelle assembly 10 incorporates a fan exhaust nozzle 14 and core cowl 16 which form a fan flow duct 18. A track 20 is circumferentially mounted on or in the fan exhaust nozzle 14 proximate a trailing edge 22, as seen in detail in FIG. 2. A pressure measurement rake 24 extends from a carriage 26 constrained for angular translation in the track 20. As shown in FIGS. 3 and 4, translation of the carriage 26 in the track 20 allows positioning of the pressure measurement rake 24 over a range of selected azimuthal angles (representative angles identified as 28a, 28b, 28c, 28d and 28e) about an engine axis 30, as measured from an engine center plane 32, to place the rake in range of positions (designated as 24a-24e) in the flow field of the fan flow duct 18. Azimuthal angles presented in the drawings are selected arbitrarily at 30° increments as exemplary with much finer variation in azimuth obtainable.

For the exemplary implementation the fan exhaust nozzle 14 is an acceptance test tool replacing a production cowl on the engine for ground test without thrust reversing capability. The track 20 is mounted on the outer surface of the fan exhaust nozzle 14. However, in alternative embodiments, the track may be machined into or mounted within an inner surface of the fan exhaust nozzle 14 providing a substantially flush aerodynamic surface to avoid flow perturbation. An inner surface mounting additionally allows positioning of the track with the carriage and pressure measurement rake at a desired longitudinal position relative to the engine axis within the cowl and one or more tracks may be employed. While the exemplary implementation is not intended for in-flight use, modification of flight worthy fan exhaust nozzles to allow in-flight measurement would be possible with alternative implementations.

As seen in detail in FIGS. 5-8 for the exemplary implementation, the pressure measurement rake 24 is attached to the carriage 26 on a base plate 27 with a mounting arm 34 extending aft from the carriage 26. A probe mount 36 extends from the mounting arm 34 to protrude radially inwardly into the fan flow duct 18 (as seen in FIG. 2). The mounting arm 34 has a sufficient length 35 to position the probe mount 36 longitudinally aft of the trailing edge 22 of the fan exhaust nozzle 14. A plurality of pressure probes 38 are mounted to a leading edge 40 of the probe mount 36. The probe mount 36 may employ an airfoil cross section to minimize aerodynamic distortion and drag in the fan flow. Probe mount 36 and mounting arm 34 are sufficiently rigid to maintain geometric stability when exposed to the fan flow.

Carriage 26 employs two lower roller sets 42a, 42b supported by axles 44a, 44b attached to or extending from the base plate 27. Base plate 27 may be curved to concentrically match the curvature of the track 20. The lower roller sets roll on an inner radial surface 45a of a race 46 in the track 20. Two upper roller sets 48a, 48b are also attached to the carriage 26 with axles 50a, 50b and engage an outer radial surface 45b of the track race 46 shown in the phantom section of the track 20 in FIG. 5. A motor 52 is engaged to axle 44b or 50b to drive roller set 42b or 48b. In exemplary embodiments, the motor 52 is a stepper motor to provide precise azimuthal positioning of the carriage 26 and probe mount 36. Additionally, one or more of the roller sets 42a, 42b, 48a, 48b may be pinions engaged in rack gearing 49 (rack gearing 49 not identified) on the inner or outer radial surface of the track race 46 for enhanced positional stability. Motor 52 may alternatively employ a separate drive wheel to contact the track or as a pinion engaging a rack in the track. Upper and lower roller sets provide opposite rotation during translation in the track allowing close support of the carriage within the race 46.

Figure 9:
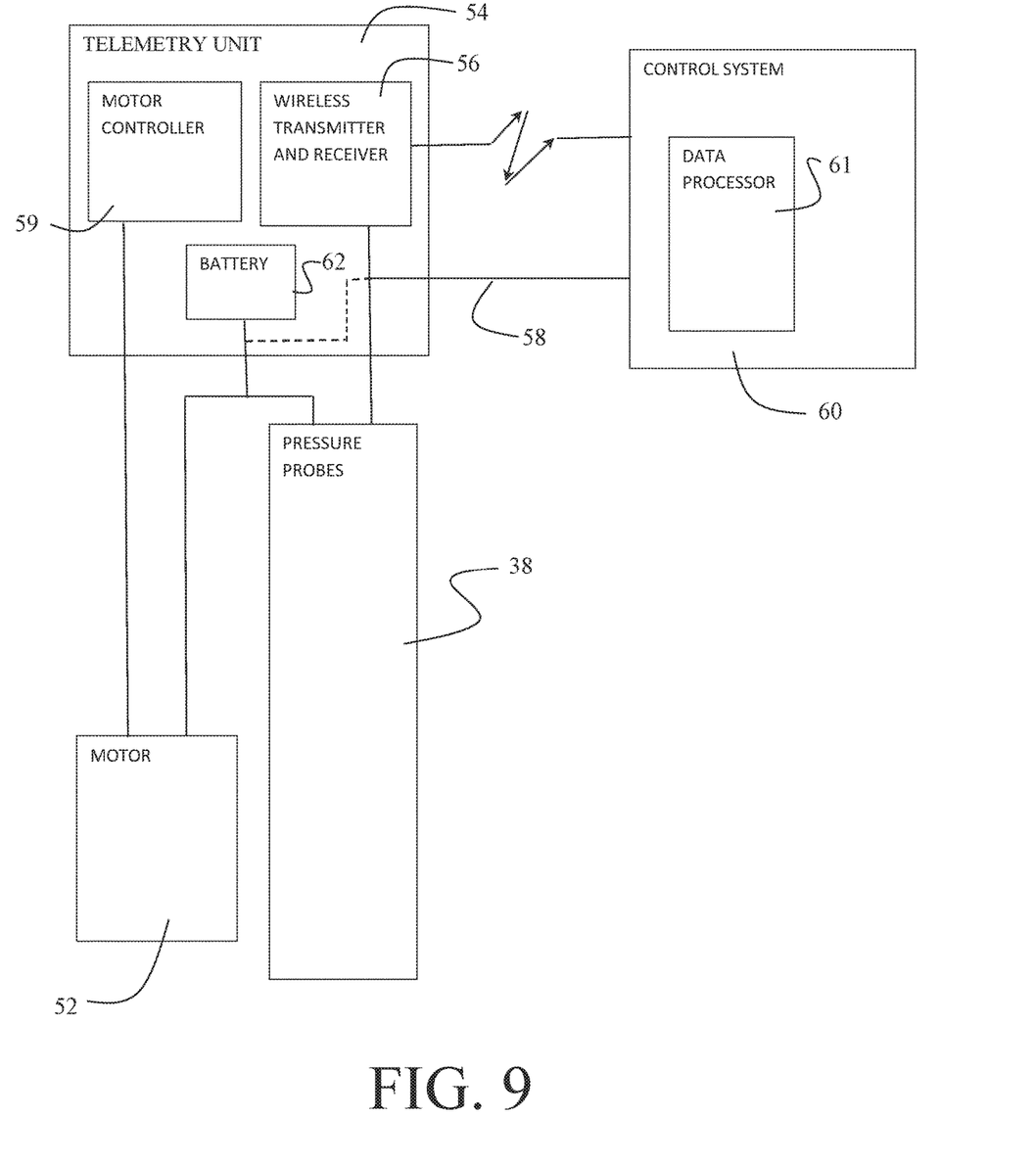
FIG. 9 is a block diagram of the telemetry and control components for the exemplary implementation.

The pressure measurement rake 24 includes a telemetry unit 54 which is interconnected with the plurality of pressure probes 38 and the motor 52. As seen in FIG. 9, the telemetry unit 54 may incorporate a wireless transmitter and receiver 56 or may be connected to transmission cables 58 for transmission of pressure data from the plurality of pressure probes 38 and for control input through a motor controller 59 providing position signals to the motor 52 from a control system 60 having a data processor 61. The control system 60 may integrate processing requirements for the motor controller 59. Power for the motor 52, plurality of pressure probes 38 and telemetry unit 54 may be provided by a battery 62 or through the transmission cables 58. In alternative embodiments both power interconnection and data transmission may be accomplished via brush contacts with an embedded conductor in the track 20.

Figure 10:
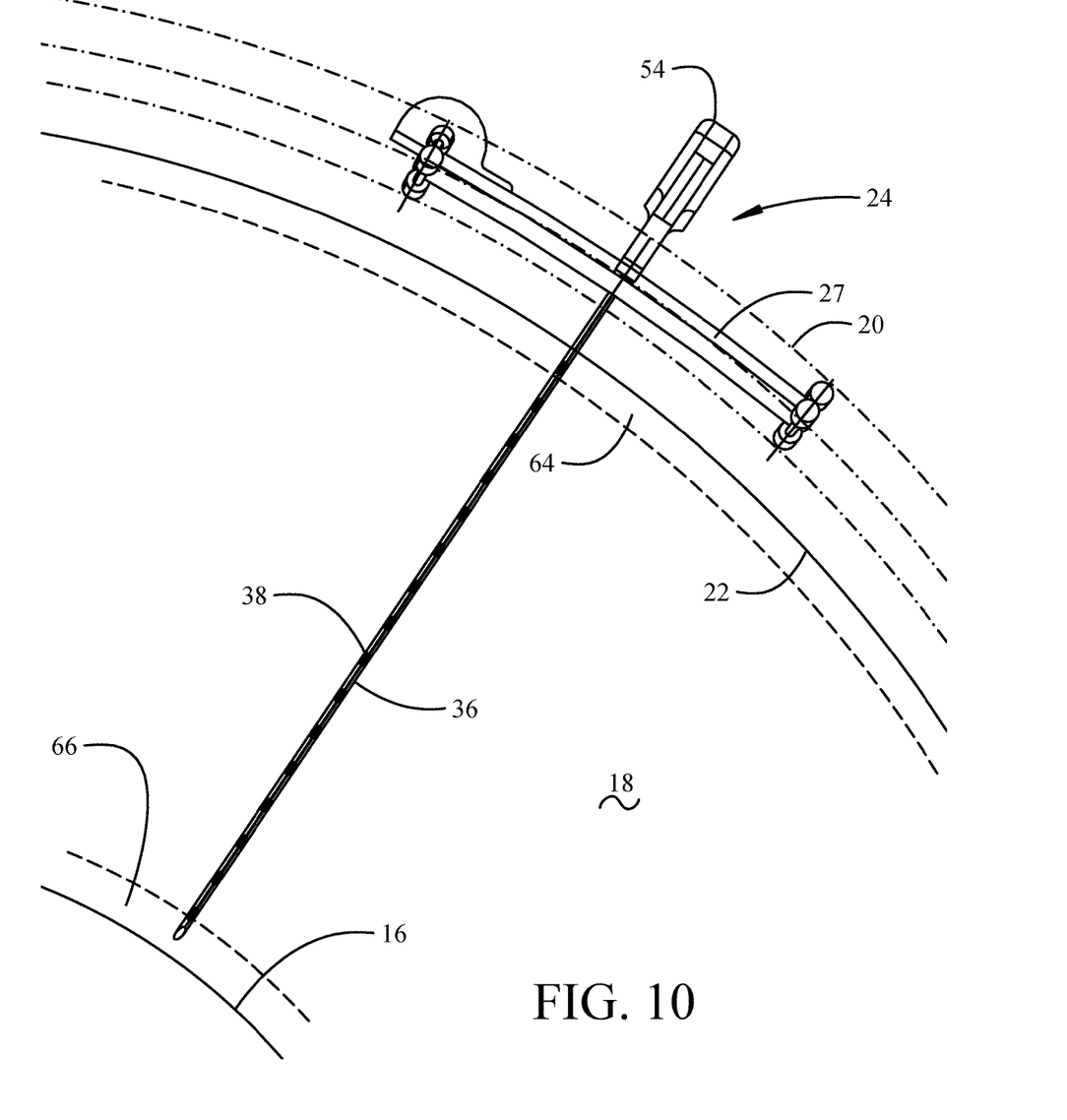
FIG. 10 is a detailed front view of the pressure measurement rake in the fan exhaust nozzle exit flow field.

As seen in FIG. 10, the pressure measurement rake 24 azimuthally positioned at a desired location in the propulsive flow field of the fan flow duct 18 extends radially inward positioning the plurality of pressure probes 38 between the trailing edge 22 fan exhaust nozzle 14 and the core cowl 16. For the exemplary implementation, spacing of the plurality of pressure probes 38 is approximately 1 inch or less. Multiple probes more closely spaced at approximately 0.10 inch or less may be present in the outer boundary layer 64 proximate an inner wall of the fan exhaust nozzle 14 and an inner boundary layer 66 proximate an outer wall of the core cowl 16.

Figure 11:
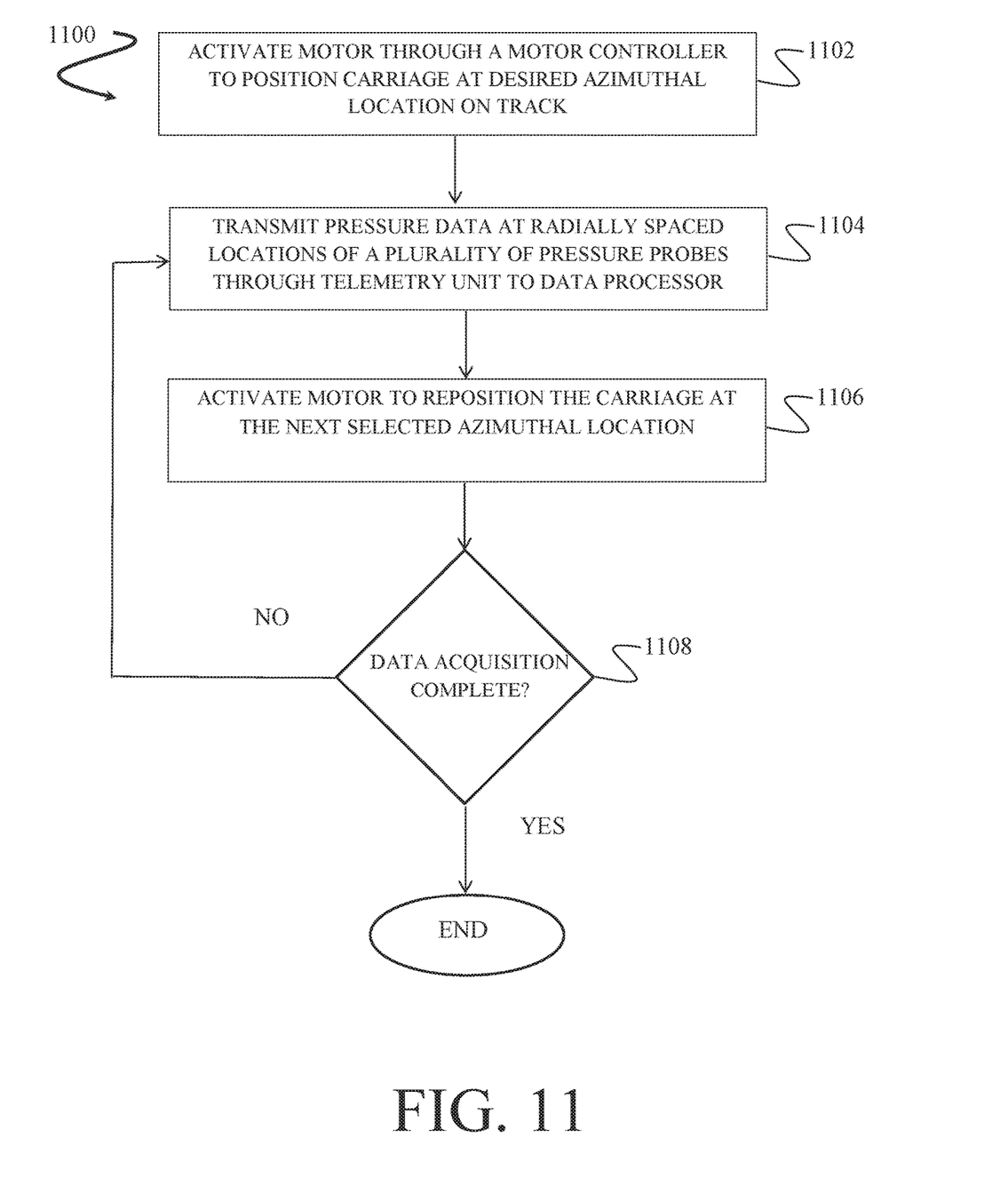
FIG. 11 is a flow chart showing a method for total pressure measurement of a propulsive flow field.

The implementation disclosed herein provides a method 1100 for total pressure measurement of the propulsive flow field as shown in FIG. 11. Motor 52 is activated through motor controller 59 as commanded by data and control system 60 to position the carriage 26 of the pressure measurement rake 24 at a desired azimuthal location in the track 20, step 1102. Pressure data at radially spaced locations of the plurality of pressure probes 38 is transmitted through telemetry unit 54 to the data processor 61, step 1104. Motor 52 is activated to reposition the carriage 26 at the next selected azimuthal location, step 1106 and, unless data acquisition is complete, step 1108, additional data is acquired over the range of selected azimuthal locations by returning to step 1104.

Figure 12:
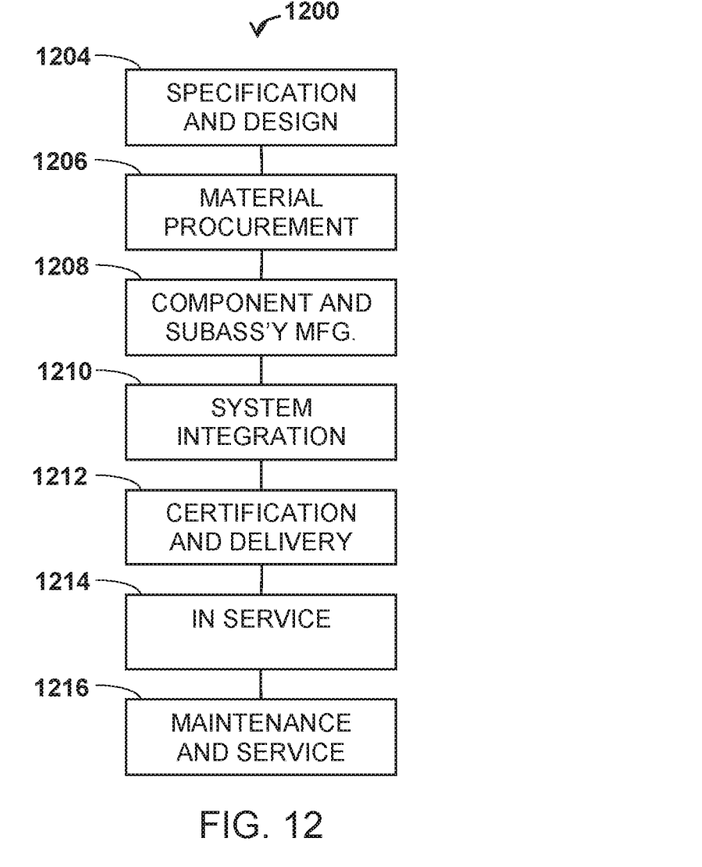
FIG. 12 is a flow diagram of aircraft production and service methodology.
Figure 13:
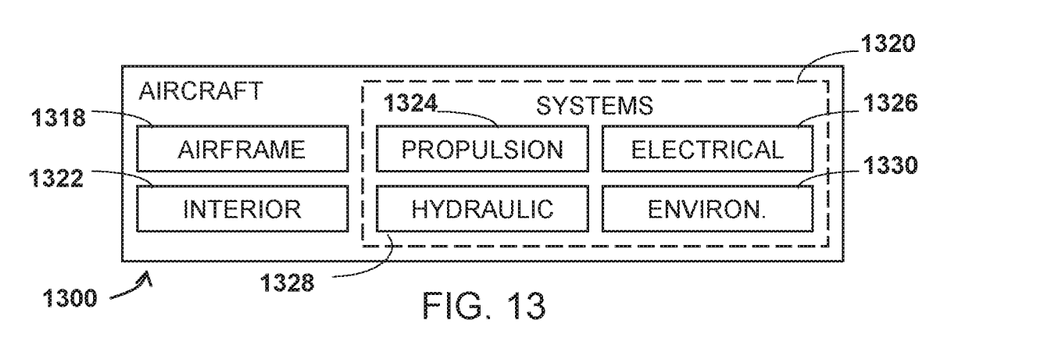
FIG. 13 is a block diagram of an aircraft.

Referring FIGS. 12 and 13, implementations of the disclosure herein may be described in the context of an aircraft manufacturing and service method 1200 as shown in FIG. 12 and an aircraft 1300 as represented in FIG. 13. During pre-production, exemplary method 1200 may include specification and design 1204 of the aircraft 1300 and material procurement 1206. During production, component and subassembly manufacturing 1208 and system integration 1210 of the aircraft 1300 takes place. Thereafter, the aircraft 1300 may go through certification and delivery 1212 in order to be placed in service 1214. While in service by a customer, the aircraft 1300 is scheduled for routine maintenance and service 1216 (which may include modification, reconfiguration and refurbishment).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity or service organization.

As shown in FIG. 13, the aircraft 1300 produced by exemplary method 1200 may include an airframe 1318, incorporating the structures such as the wing structures described herein, and a plurality of systems 1320 and an interior 1322. Examples of high-level systems 1320 include one or more of a propulsion system 1324, to which the implementations disclosed herein are most applicable, an electrical system 1326, a hydraulic system 1328, and an environmental system 1330.

Implementations and methods described herein may be employed during any one or more of the stages of the production and service method 1200. For example, final acceptance testing of the propulsion system 1324 during system integration 1210 or certification and delivery 1212 may be accomplished in a manner as disclosed and maintenance in process 1216 performed on propulsion system 1324 while the aircraft 1300 is in service. One or more implementations, methods, or a combination thereof may be utilized during production stages such as component and subassembly manufacturing 1208 and system integration 1210, thus substantially expediting completion of and reducing the cost of an aircraft 1300. Similarly, one or more of apparatus implementations, methods, or a combination thereof may be utilized while the aircraft 1300 is in service, for example and without limitation, for maintenance and service 1216.

Having now described various implementations in detail as required by the patent statutes, those skilled in the art will recognize modifications and substitutions to the specific implementations disclosed herein. Such modifications are within the scope and intent of the present disclosure as defined in the following claims.

What is claimed is:

1. A system for total pressure measurement of a propulsive stream, the system comprising:
    a track circumferentially mounted on an exhaust nozzle proximate a trailing edge of the exhaust nozzle;
    a carriage mounted in the track and adapted for angular translation relative to an engine centerline; and,
    a pressure measurement rake extending from the carriage and having
        a probe mount protruding inward into a flow duct, and
        a plurality of pressure probes mounted to a leading edge of the probe mount.

2. The system for total pressure measurement of a propulsive stream as defined in claim 1 further comprising:
    a telemetry unit connected to the plurality of pressure probes; and,
    a data processor receiving pressure data from the telemetry unit.

3. The system for total pressure measurement of a propulsive stream as defined in claim 2 wherein the carriage comprises:
    a base plate;
    roller sets supported by axles extending from the base plate and engaging the track; and,
    a motor adapted to translate the carriage in the track.

4. The system for total pressure measurement of a propulsive stream as defined in claim 3 wherein the roller sets comprise:
    two lower roller sets attached with axles to the base plate, said lower roller sets rolling on an inner radial surface of a race in the track; and,
    two upper roller sets attached with axles to the base plate and engaging an outer radial surface of the race.

5. The system for total pressure measurement of a propulsive stream as defined in claim 4 wherein the motor is engaged to one of the lower roller sets or one of the upper roller sets.

6. The system for total pressure measurement of a propulsive stream as defined in claim 3 wherein the motor is a stepper motor and further comprising a motor controller adapted to provide position signals to the stepper motor.

7. The system for total pressure measurement of a propulsive stream as defined in claim 5 wherein one of the roller sets comprises a pinion operably engaging a rack in the race.

8. The system for total pressure measurement of a propulsive stream as defined in claim 6 wherein the telemetry unit further comprises a battery interconnected to provide power to the plurality of pressure probes and the motor.

9. The system for total pressure measurement of a propulsive stream as defined in claim 3 further comprising a mounting arm extending aft from the carriage, said probe mount depending from the mounting arm to protrude into the flow duct.

10. The system for total pressure measurement of a propulsive stream as defined in claim 9 wherein the mounting arm has a length to position the probe mount longitudinally aft of the trailing edge of the exhaust nozzle.

11. The system for total pressure measurement of a propulsive stream as defined in claim 1 wherein the probe mount has an airfoil cross section to minimize aerodynamic distortion and drag.

12. The system for total pressure measurement of a propulsive stream as defined in claim 9 wherein the plurality of pressure probes are positioned by the probe mount between the trailing edge of the exhaust nozzle and a core cowl.

13. The system for total pressure measurement of a propulsive stream as defined in claim 12 wherein spacing of the plurality of pressure probes is 1 inch or less.

14. The system for total pressure measurement of a propulsive stream as defined in claim 12 wherein multiple probes of the plurality of pressure probes are spaced at 0.10 inch or less in an outer boundary layer proximate an inner wall of the exhaust nozzle and an inner boundary layer proximate an outer wall of the core cowl.

15. The system for total pressure measurement of a propulsive stream as defined in claim 3 wherein the telemetry unit incorporates a wireless transmitter and receiver for transmission of pressure data from the plurality of pressure probes to the data processor.

16. The system for total pressure measurement of a propulsive as defined in claim 15 wherein the wireless transmitter and receiver is connected to provide a control input through a motor controller providing position signals to the motor from a control system.

17. The system for total pressure measurement of a propulsive stream as defined in claim 16 wherein the control system integrates processing requirements for the motor controller and data processor.

18. The system for total pressure measurement of a propulsive stream as defined in claim 2 further comprising transmission cables interconnecting the telemetry unit and data processor.

19. A method for total pressure measurement of a propulsive stream, the method comprising:
    activating a motor through a motor controller as commanded by a control system;
    positioning a carriage of a pressure measurement rake at a desired location in a track;
    transmitting pressure data from radially spaced locations of a plurality of pressure probes mounted to the carriage through a telemetry unit to a data processor; and
    activating the motor to reposition the carriage at a next selected location.

20. The method as defined in claim 19 further comprising transmitting additional pressure data from the plurality of pressure probes and reactivating the motor to reposition the carriage through a range of selected locations.

* * * * *